(No Model.)
J. H. DUMONT.
FILTER.
No. 316,885. Patented Apr. 28, 1885.
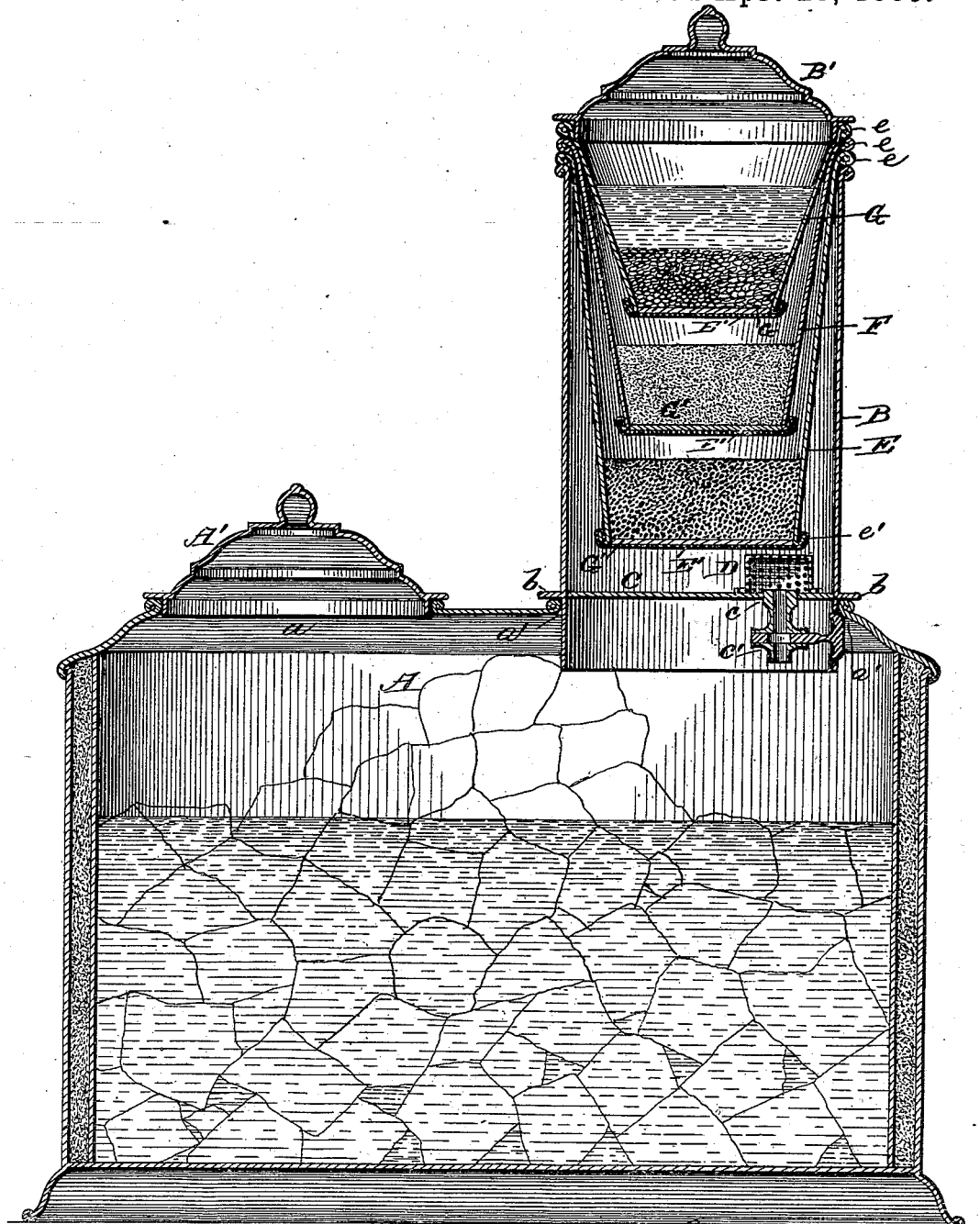
WITNESSES
INVENTOR James H. Dumont
Attorney

UNITED STATES PATENT OFFICE.

JAMES HERVEY DUMONT, OF NEW YORK, N. Y.

FILTER.

SPECIFICATION forming part of Letters Patent No. 316,885, dated April 28, 1885.

Application filed October 7, 1884. (No model.)

*To all whom it may concern:*

Be it known that I, JAMES H. DUMONT, a citizen of the United States of America, residing at New York City, in the county of New York and State of New York, have invented certain new and useful Improvements in Water-Filterers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in filters which are adapted to be supported upon a water-cooler or receptacle, the object of my invention being to provide such a filter which is so constructed that the parts can be readily removed from each other and the water-cooler.

I have illustrated my invention by a sectional view, in which A represents the tank or receptacle, which may be cylindrical or oval in shape, and is provided with double walls, the space between said walls being filled with a non-conducting packing. The receptacle A is provided with two openings, $a\ a'$, in its top, the opening $a$ being provided with a cover, A', while within the opening $a'$ fits a flanged cylinder, B, which is adapted to support receptacles which contain the filtering mediums. The cylinder B, opposite its flange $b$, is provided interiorly with a bottom, C, which has an opening, $c$, within which is secured a faucet, $c'$. Over this opening $c'$ is secured a perforated box or strainer, D.

Within the cylinder B are suspended three tapered receptacles, E F G, which are of different lengths and are provided at their upper portions with beaded rims $e$. These receptacles are similar in construction, with the exception as to length, and they are provided at their bottoms with upset ends $e'$, which embrace the upset rim of a perforated disk, E', which forms the bottom of the receptacles. Above this perforated bottom is placed a strainer, G', of textile fabric, above which fabric is placed the filtering material, which in the upper receptable consists of small pebbles. In the next receptacle is placed sand, while the bottom receptacle is provided with bone-black or animal charcoal.

Above the upper receptacle, G, a cover, B', is placed, which cover is adapted to fit within the top of either of the receptacles as well as within the opening $a'$ when the cylinder B is removed from the cooler.

By the construction hereinbefore described it will be seen that one or more of the receptacles containing the filtering materials may be employed, and that the use of the entire series is not necessary; also, that the entire series of receptacles may be removed from the cylinder B at the same time; also, that said filtering apparatus is adapted to be applied to water-coolers as already manufactured.

When it is desired to filter liquids, said liquids are poured into the upper receptacle and pass through the filtering medium contained therein into the next receptacle, and so on until it passes out of the stop-cock free from its impurities.

The textile fabric which is placed above the wire-cloth or perforated bottom E' will, besides straining the liquid, prevent any of the finer particles of the filtering material escaping.

By this construction the filterers can be readily removed and transported and the contents removed therefrom, washed, and replaced.

I am aware that prior to my invention water-filterers have been constructed which are provided with an outer casing, a removable top, and a series of receptacles with perforated bottom, which rest one upon the other, and I do not claim such construction broadly, as with such a filterer the receptacles which contain the filtering medium can not be removed from the casing simultaneously, but have to be removed successively.

I claim—

1. The combination, in a filter attachment for water-coolers, of a vertical cylinder having vertical and horizontal flanges located at its lower end and a bottom provided with a suitable discharge-opening, and a cock for controlling the same, a series of tapering receptacles provided with reticulated bottoms and beaded at their upper edges to adapt them to rest on the upper edge of said cylinder and on each other, and located relatively to contain different grades of filtering material, substantially as set forth.

2. The combination, with a water cooler, as specified, of a filter attachment consisting of a vertical cylinder having vertical and horizontal flanges located at its lower end and a bottom provided with suitable discharge-openings and cock for controlling the same, a series of tapering receptacles provided with reticulated bottoms and beaded at their upper edges to adapt them to rest upon the upper edge of the cylinder and on each other, and located respectively to contain different grades of filtering, substantially as set forth.

In testimony whereof I affix my signature in presence of two witnesses.

JAMES HERVEY DUMONT.

Witnesses:
E. J. MURRAY,
W. H. DUMONT.